(12) United States Patent
Vu et al.

(10) Patent No.: US 11,281,935 B2
(45) Date of Patent: Mar. 22, 2022

(54) 3D OBJECT DETECTION FROM CALIBRATED 2D IMAGES

(71) Applicant: Bentley Systems, Incorporated, Exton, PA (US)

(72) Inventors: Hoang Hiep Vu, Courbevoie (FR); Renaud Keriven, Fontenay sous Bois (FR)

(73) Assignee: Bentley Systems, Incorporated, Exton, PA (US)

( * ) Notice: Subject to any disclaimer, the term of this patent is extended or adjusted under 35 U.S.C. 154(b) by 30 days.

(21) Appl. No.: 16/726,412

(22) Filed: Dec. 24, 2019

(65) Prior Publication Data

US 2021/0110202 A1 Apr. 15, 2021

(30) Foreign Application Priority Data

Oct. 15, 2019 (EP) .................................... 19306344

(51) Int. Cl.
*G06K 9/62* (2006.01)
*G06T 7/73* (2017.01)

(52) U.S. Cl.
CPC ......... *G06K 9/6218* (2013.01); *G06K 9/6201* (2013.01); *G06T 7/74* (2017.01); *G06T 2210/12* (2013.01)

(58) Field of Classification Search
CPC ...... G06K 9/6218; G06K 9/6201; G06T 7/74; G06T 2210/12
See application file for complete search history.

(56) References Cited

U.S. PATENT DOCUMENTS

| | | | |
|---|---|---|---|
| 7,099,510 B2 | 8/2006 | Jones et al. | |
| 7,742,650 B2 | 6/2010 | Xu et al. | |
| 8,406,470 B2 | 3/2013 | Jones et al. | |
| 9,087,232 B2 | 7/2015 | Solem et al. | |
| 9,424,493 B2 | 8/2016 | He et al. | |
| 9,619,691 B2 | 4/2017 | Pang et al. | |
| 2002/0163515 A1* | 11/2002 | Sowizral | ................. G06T 15/40 345/419 |

(Continued)

FOREIGN PATENT DOCUMENTS

WO WO-2014190081 A1 11/2014

OTHER PUBLICATIONS

Song et al. "SUN RGB-D: A RGB-D Scene Understanding Benchmark Suite", Proceedings of the IEEE Conference on Computer Vision and Pattern Recognition (CVPR), 2015, pp. 567-576 (Year: 2015).*

(Continued)

*Primary Examiner* — Qian Yang
(74) *Attorney, Agent, or Firm* — Cesari and McKenna, LLP; James A. Blanchette (57) ABSTRACT

In an example embodiment, techniques are provided for 3D object detection by detecting objects in 2D (as 2D bounding boxes) in a set of calibrated 2D images of a scene, matching the 2D bounding boxes that correspond to the same object and reconstructing objects in 3D (represented as 3D bounding boxes) from the corresponding, matched 2D bounding boxes. The techniques may leverage the advances in 2D object detection to address the unresolved issue of 3D object detection. If sparse 3D points for the scene are available (e.g., as a byproduct of SfM photogrammetry reconstruction) they may be used to refine the 3D bounding boxes (e.g., to reduce their size).

21 Claims, 10 Drawing Sheets

(56) References Cited

U.S. PATENT DOCUMENTS

| | | | | |
|---|---|---|---|---|
| 2002/0190982 | A1* | 12/2002 | Kotcheff | G06T 17/20 |
| | | | | 345/420 |
| 2015/0254834 | A1* | 9/2015 | Chandraker | G06T 7/20 |
| | | | | 382/154 |
| 2016/0292513 | A1* | 10/2016 | Kozicz | F16P 3/142 |
| 2017/0124692 | A1 | 5/2017 | Yoshida | |

OTHER PUBLICATIONS

Sharma, Kartik Umesh, et al., "A Review and an Approach for Object Detection in Images," Interscience Enterprises Ltd., Int. J. Computational Vision and Robotics, vol. 7, Nos. ½, Jan. 2017, pp. 196-237.

Velizhev, Alexander, et al., "Implicit Shape Models for Object Detection in 3D Point Clouds," ISPRS Annals of the Photogrammetry, Remote Sensing and Spatial Information Sciences, vol. 1-3, 2012, XXII ISPRS Congress, Melbourne, Australia, Aug. 25-Sep. 1, 2012, pp. 179-184.

Cao, Pei, et al., "Multi-View Frustum Pointnet for Object Detection in Autonomous Driving," IEEE, 2019 International Conference on Image Processing (ICIP), Sep. 22, 2019, pp. 3896-3899.

"European Search Report and Written Opinion," European Application No. 19306344.3-1207, Applicant: Bentley Systems, Incorporated, dated Jun. 26, 2020, pp. 1-14.

\* cited by examiner

3D OBJECT DETECTION FROM CALIBRATED 2D IMAGES

RELATED APPLICATIONS

This Application claims priority to EP Application No. 19306344.3 filed Oct. 15, 2019 by Hoang Hiep Vu et al., titled "3D Object Detection from Calibrated 2D Images", the contents of which are incorporated by reference herein in their entirety.

BACKGROUND

Technical Field

The present disclosure relates generally to object detection and more specifically to techniques for three-dimensional (3D) object detection.

Background Information

In recent years, a number of effective techniques have been developed to detect objects in two-dimensional (2D) space (referred to as "2D object detection"). One effective technique is a convolutional neural network, which may accurately detect objects in 2D space from a 2D image of the scene. However, there is a growing desire to detect objects in 3D space (referred to as "3D object detection"). 3D object detection is still an open problem, and is not practical in many cases. First, 3D object detection is often simply not accurate, with the size, shape or location of the detected object differing considerably from that of the actual object. Second, 3D object detection may require specific data sources that may not always be available, or if available, may not be fully accurate. For example, some 3D object detection techniques require a 3D model (e.g., a 3D mesh) be reconstructed, for example, using structure-from-motion (SfM) photogrammetry, and then operate upon the 3D model. However, such reconstruction may not always be successful, such that a 3D model is not available, or at least some difficult-to-reconstruct objects (e.g., glass, thin structures, etc.) may not be accurately represented in the 3D model. Third, 3D object detection may consume an inordinate amount of hardware resources (e.g., processing and memory resources). Such resource consumption may burden computing devices, leading to slow response time and delays, and even preclude 3D object detection from being performed on some type of computing device (e.g., low-power mobile devices).

Accordingly, there is a need for improved techniques for 3D object detection that may address some or all of these shortcomings.

SUMMARY

In various example embodiments, techniques are provided for 3D object detection by detecting objects in 2D (as 2D bounding boxes) in a set of calibrated 2D images of a scene, matching the 2D bounding boxes that correspond to the same object, and reconstructing objects in 3D (represented as 3D bounding boxes) from the corresponding matched 2D bounding boxes. The techniques may leverage the advances in 2D object detection to address the unresolved issue of 3D object detection. If sparse 3D points for the scene are available (e.g., as a byproduct of SfM photogrammetry reconstruction) they may be used to refine the 3D bounding boxes (e.g., to reduce their size). Among other advantages, such techniques may improve accuracy, may be less dependent on the availability of specific data sources, and may decrease resource utilization to improve the operation of computing devices utilized in the task.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Definitions

As used herein, the term "scene" refers to a portion of the physical environment which may include one or more objects. A scene may be captured in a set of one or more images (e.g., 2D images) produced by one or more cameras.

As used herein, the term "calibrated" when used in the context of an image refers to the image having known acquisition parameters (i.e. camera parameters), such as position, orientation focal length, etc.

Figure 1A:
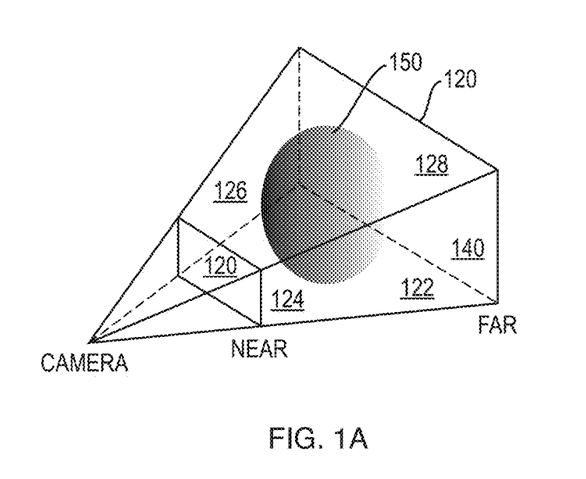
FIG. 1A is a diagram illustrating an example camera cone, bounded by planes extending from the position of the camera, by a near plane and a far plane.

As used herein, the term "camera cone" refers to a region of 3D space representing as a truncated cone of vision of a camera, bounded by planes extending from the position of the camera, by a near plane that represents an inner limit of the vision and a far plane that represents an outer limit of the vision. FIG. 1A is a diagram 100 illustrating an example camera cone 120, bounded by planes 122-128 extending from the position of the camera, by a near plane 130 and a far plane 140. The camera cone 120 may capture an object 150.

Figure 1B:
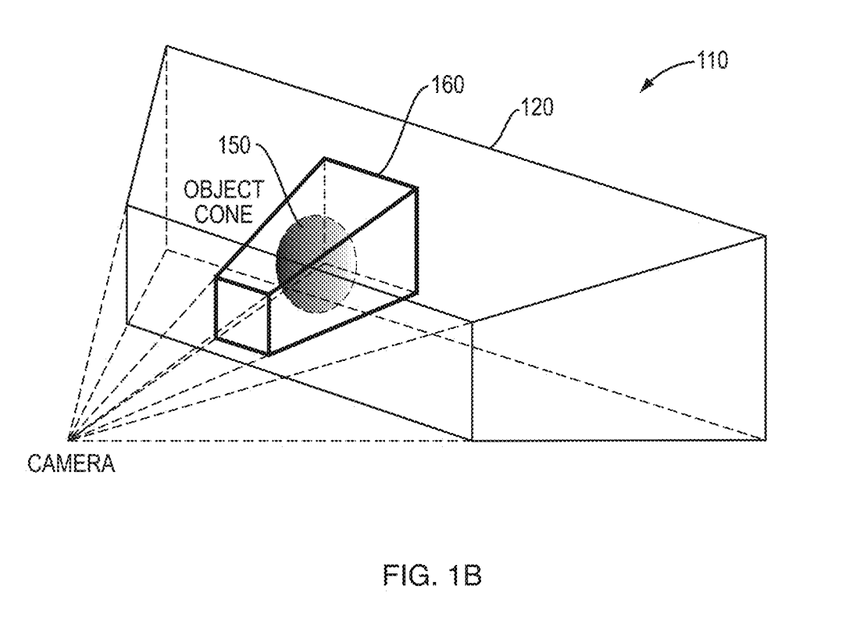
FIG. 1B is a diagram illustrating an example object cone for an object that is a sub-region of a camera cone.

As used herein, the term "object cone" refers to region of 3D space representing a truncated cone of that includes an object. An object cone is a sub-region of a camera cone and represents a projection of a 2D bounding box for the object into 3D space. FIG. 1B is diagram 110 illustrating an example object cone 160 for an object 150 that is a sub-region of a camera cone 120.

Example Embodiments

Figure 2:
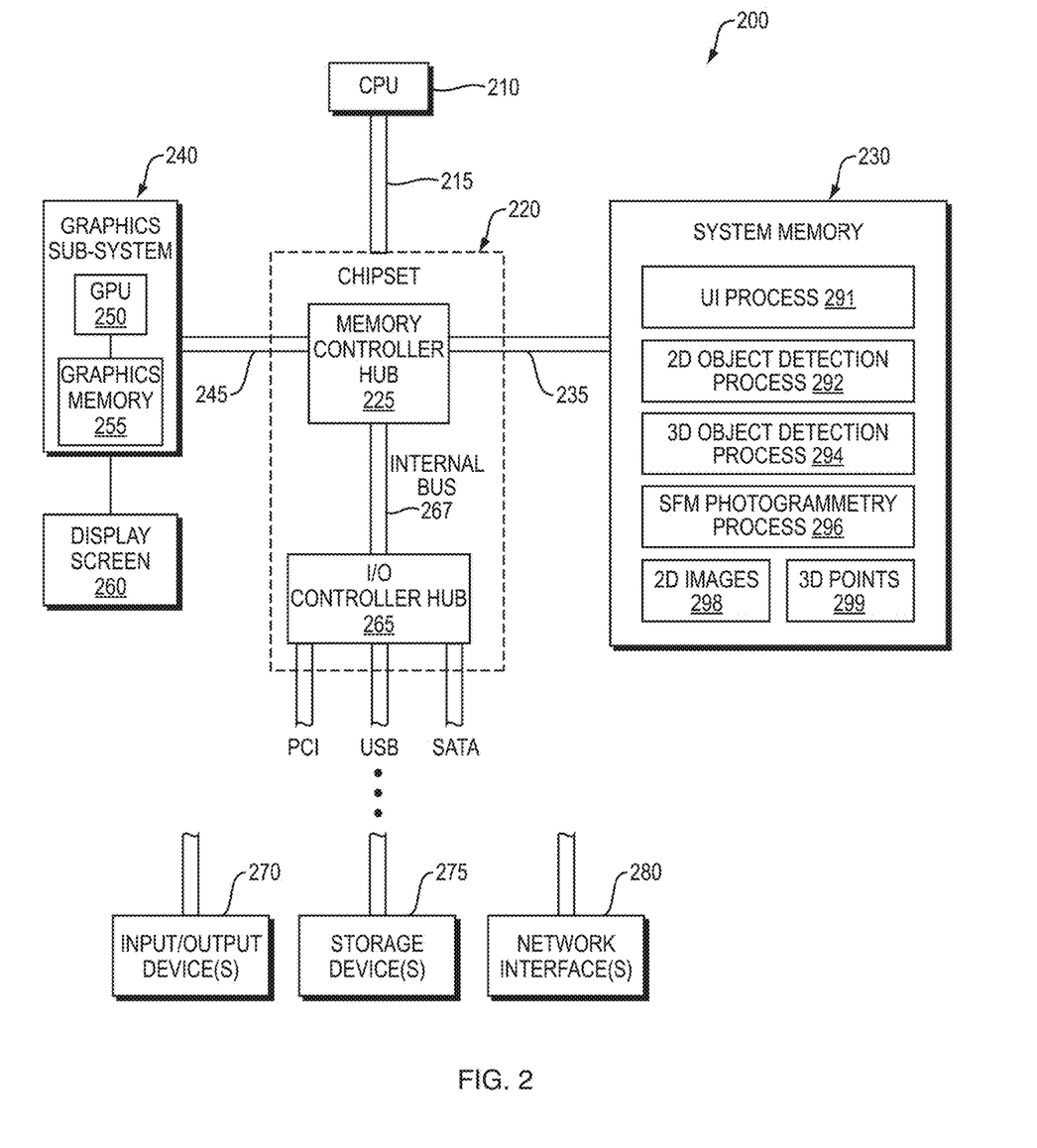
FIG. 2 is a block diagram of an example electronic device (e.g., a computing device) that may be used with the present techniques.

FIG. 2 is a block diagram of an example electronic device (e.g., a computing device) that may be used with the present techniques. The electronic device includes a central processing unit (CPU) 210 that may be coupled to a chipset 220 by a front side bus 215. The chipset 220 includes a memory controller hub 225 that is responsible for communications with high-speed devices such as system memory 230 and a graphics subsystem (e.g., a graphics card) 240. The memory controller hub 225 is coupled to the system memory 230 which is adapted to store a wide range of software and data being actively used by the CPU 210 by a high-speed memory bus 235. The memory controller hub 225 is coupled to a graphics subsystem 240 (e.g., a graphics card) by a high-speed graphics bus 245. The graphics subsystem 240 includes a GPU 250 and graphics memory 255, among other components. The graphics subsystem 240 is coupled to at least one display screen 260.

The chipset 220 further includes an input/output controller hub 265 coupled to the memory controller hub by an internal bus 267. Among other functions, the input/output controller hub 265 may support a variety of types of peripheral buses for connecting to other system components. The system components may include one or more I/O devices 270, one or more persistent storage devices 275, one or more network interfaces 280, among other system components. The network interface(s) 280 may allow communication with other electronic devices over a computer network to enable various types of collaborative, distributed, or remote computing.

Working together, the components of the electronic device 200 (and other electronic devices in the case of collaborative, distributed, or remote computing) may execute a number of different types of software that utilize various sources of data (e.g., files) persistently stored in storage devices 275 and loaded into memory 130 when needed. For example, software of 3D reality modeling software 190, such the ContextCapture™ 3D reality modeling software available from Bentley Systems, Incorporated, may be loaded into memory and executed by the components of the electronic device. The 3D reality modeling software 290 may include a number of software processes, including a user interface (UI) process 291, a 2D object detection process 292 and a 3D object detection process 294, a SfM photogrammetry process 296, among other software processes. As explained in more detail below, working together the 2D object detection process 292 and the 3D object detection process 294 may operate to detect objects in 2D (as 2D bounding boxes) in a set of calibrated 2D images of a scene, match the 2D bounding boxes that correspond to the same object, and reconstruct objects in 3D (represented as 3D bounding boxes) from the corresponding, matched 2D bounding boxes. If information from SfM photogrammetry reconstruction is available from the SfM photogrammetry process 296, it may be used to refine the 3D bounding boxes. The software processes may 291-296 may utilize a number of types of data maintained in memory 230 and/or on a storage devices 275. This data may include the set of calibrated 2D images 298 of the scene, supplied from one or more cameras (not shown) and, in some cases, sparse 3D point 299 obtained (e.g., as a byproduct) of reconstruction by the SfM photogrammetry process 296 on the set of 2D images 298, among other data.

Figure 3A:
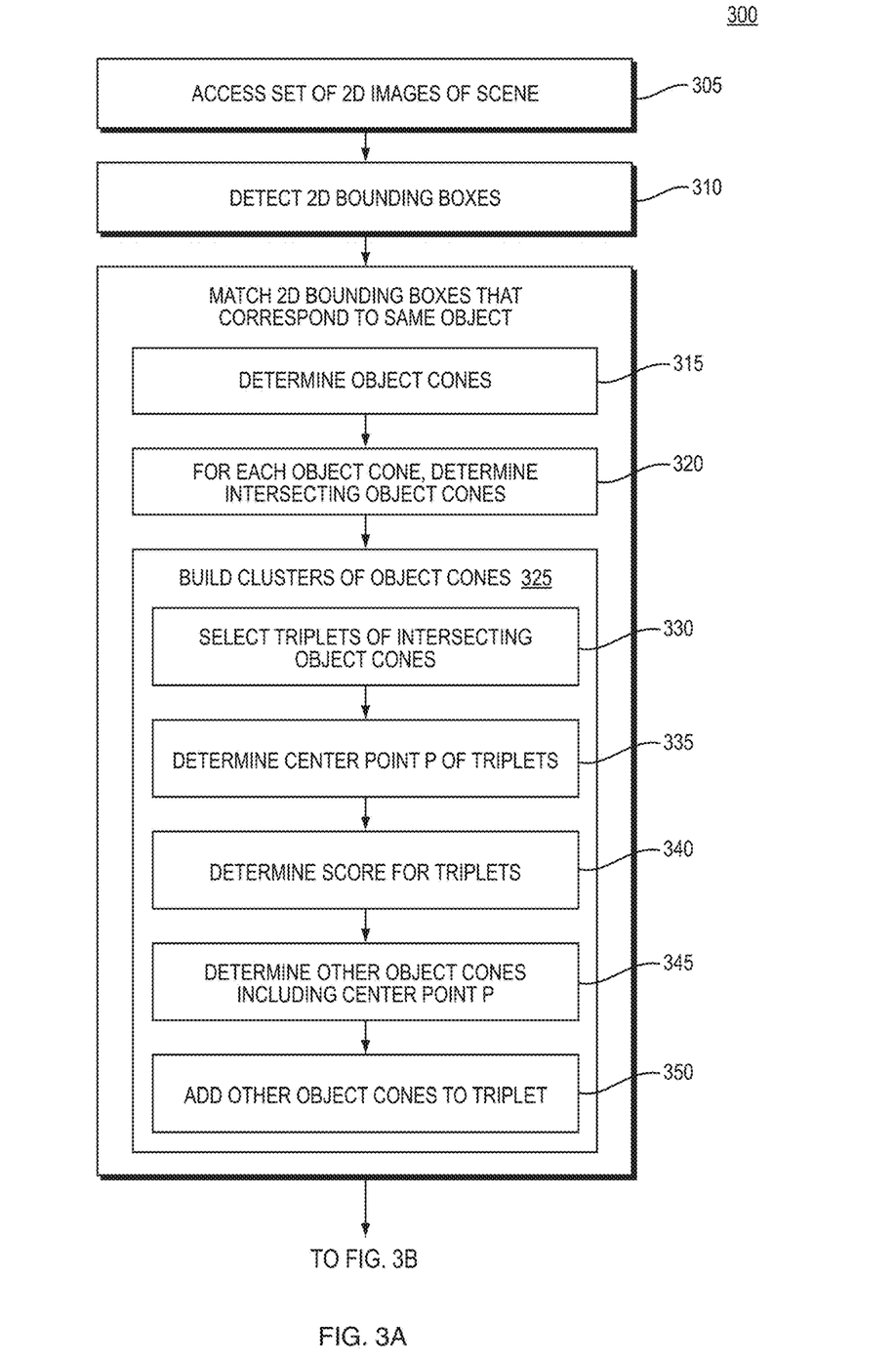
FIGS. 3A and 3B are a flow diagram of an example sequence of step for 3D object detection by detecting objects in 2D (as 2D bounding boxes) in a set of calibrated 2D images, matching the 2D bounding boxes that correspond to the same objects, and reconstructing objects in 3D (as 3D bounding boxes) from the corresponding, matched 2D bounding boxes.
Figure 3B:
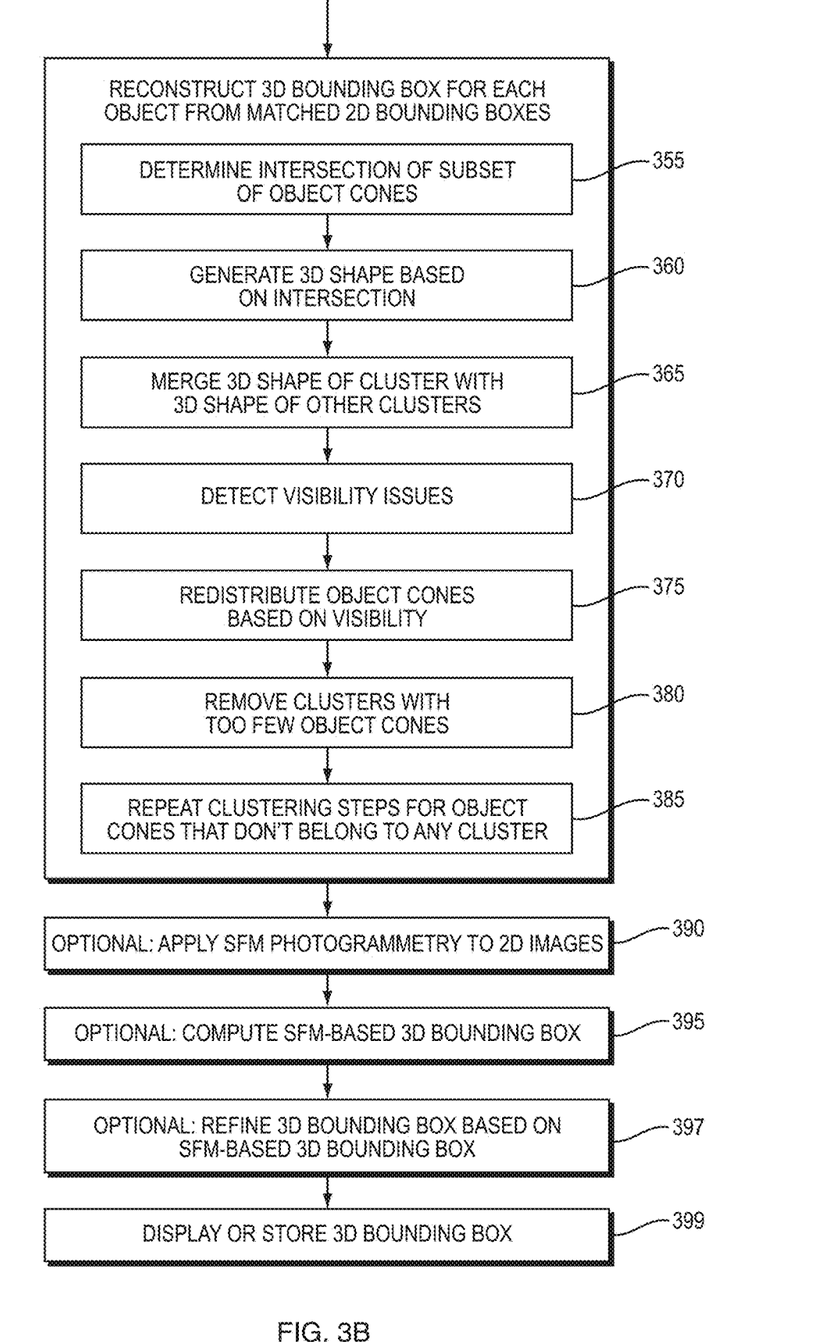
Figure 4A:
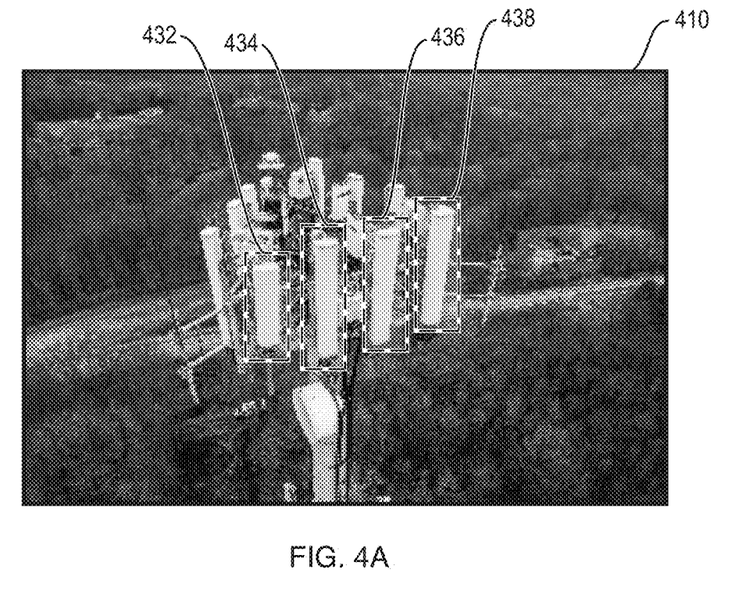
FIGS. 4A-4D are example 2D images of an antenna in which a series of antenna elements have been detected in 2D (as 2D bounding boxes)
Figure 4B:
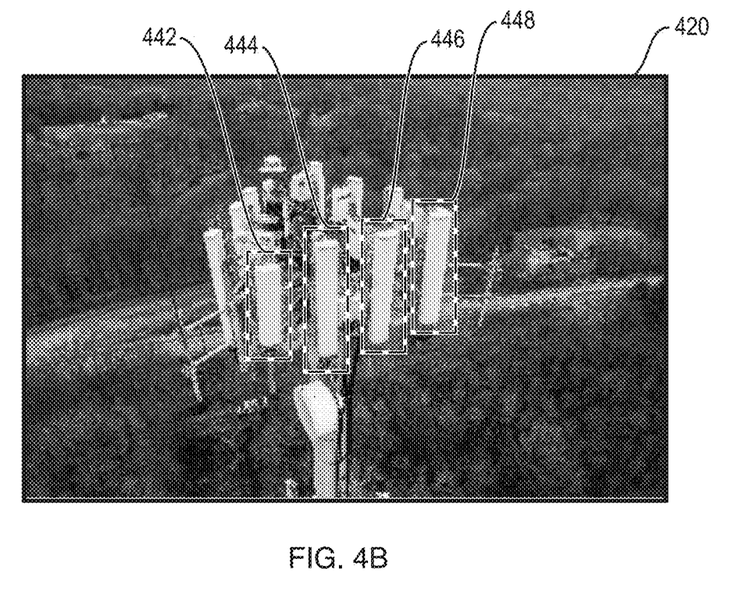
Figure 4C:
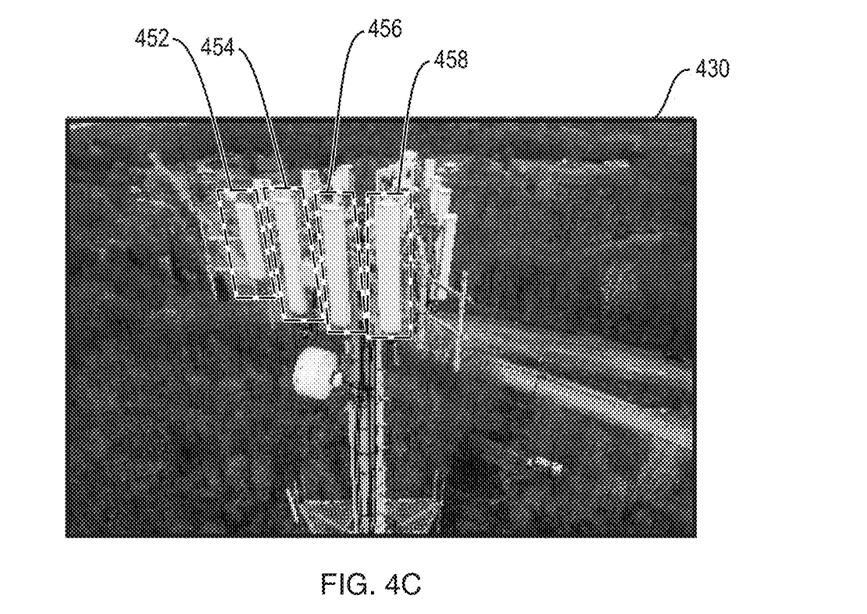
Figure 4D:
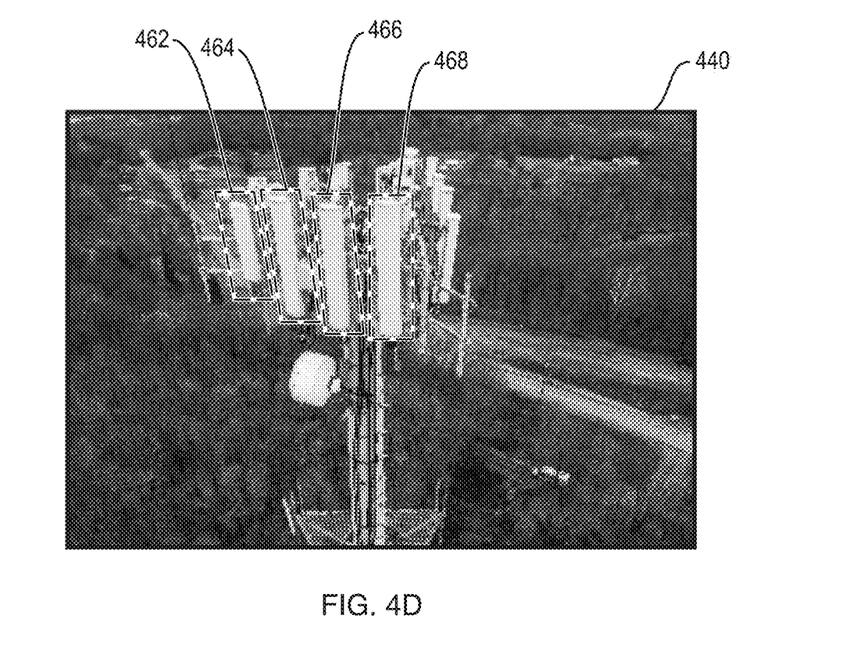

FIGS. 3A and 3B are flow diagram of an example sequence of step 300 for 3D object detection by detecting objects in 2D (as 2D bounding boxes) in a set of calibrated 2D images, matching the 2D bounding boxes that correspond to the same objects, and reconstructing objects in 3D (as 3D bounding boxes) from the corresponding, matched 2D bounding boxes. At step 305, the 3D reality modeling software 290 accesses a set calibrated 2D images 298 of a scene captured by one or more cameras (i.e., whose parameters such as position, orientation focal length, etc. are known). At step 310, the 2D object detection process 292 detects objects in 2D in the set of 2D images as 2D bounding boxes. The 2D object detection process 292 may use any of a variety of automated 2D detection techniques, for example, a convolutional neural network, deep machine learning, or manual user definition via input received via an I/O device 270 and interpreted by the UI process 291. It is expected that most of the 2D bounding boxes will correctly bound objects, but it is possible that there are false negatives (i.e. an object is not detected and there is not a 2D bounding box at its location in the 2D image), false positives (an detection occurs absent an object and there is a 2D bounding box at a location in the 2D image where there is no actual object) and/or partial detections (an object is detected but a 2D bounding box only partly covers the object, e.g., because of error in the detection algorithm, or because the object is occluded from the viewpoint of the 2D image). Robustness is desired against these situations.

As part of step 310, the 2D object detection process 292 also labels each 2D bounding box with a label (e.g., class name) that identifies a type of the object (e.g., window, car, motorcycle, book, etc.).

FIGS. 4A-4D are example 2D images 410, 420, 430, 440 of an antenna in which a series of antenna elements have been detected in 2D (as 2D bounding boxes) 410, 420, 430, 440. As can be seen, the same antenna element may be detected as a slightly different 2D bounding box in each 2D image. A label (not shown) may be associated with each 2D bounding box identifying the type of the object (e.g., antenna element)

At steps 315-350, the 3D object detection process 294 matches ones of the 2D bounding boxes that correspond to the same object. This procedure may be conducted via a number of individual operations. At step 315, the 3D object detection process 294 determines an object cone for each 2D bounding box. At step 320, for each object cone, the 3D object detection process 294 determines any other object cones that intersect the object cone. If labels are available, the determination may be limited to other object cones that share the same label.

Figure 5:
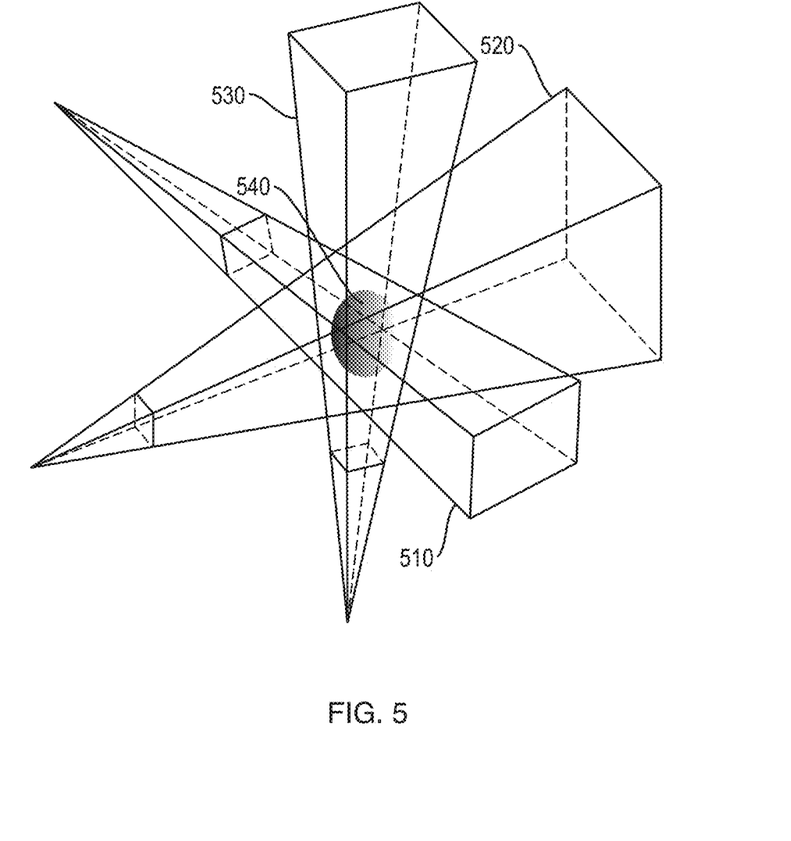
FIG. 5 is a diagram illustrating multiple (in this example, 3) intersecting object cones for an object.

An object will typically be detected in 2D in multiple 2D images leading to many object cones. In the case of ambiguity, multiple intersecting object cones from multiple 2D images will typically help decide where the object truly is located. FIG. 5 is a diagram illustrating multiple (in this example, 3) intersecting object cones 510, 520, 530 for an object 440. In this example, the 2D bounding boxes are "perfectly" detected, such that the object falls fully inside the intersection of the corresponding object cones 510, 520, 530. If the 2D bounding boxes were less than perfect, at least a portion of the object may fall outside of one or more of the object cones 510, 520, 530.

At step 325, based on the intersecting object cones, the 3D object detection process 294 builds a cluster of object cones for each object, for example, using a "greedy" clustering algorithm. Step 325 may include a number of sub-steps. At sub step 330, the 3D object detection process 294 selects triplets of intersecting object cones. A triplet may be picked randomly from among sets of three intersecting object cones. As sub step 335, the 3D object detection process 294 determines a center point P for each triplet. The center point P may be a 3D point determined by triangulation from the centers of the constituent object cones. At sub step 340, the 3D object detection process 294 determining a score for each triplet based on a number of other object cones that contain the center point P. A high score indicates that the center point P is also inside a large number of other object cones, and thereby has a high probability of containing a real object. The score may be compared to a predetermined threshold and the triplet retained or discard based on the comparison.

At sub step 345, the 3D object detection process 294 determines any other object cones that contain the center point P of the triplet for each retained triplet. At sub step 350, the 3D object detection process 294 adds the one or more other object cones to each triplet to produce each cluster.

At steps 355-380, the 3D object detection process 294 reconstructs a 3D bounding box that represents the object in 3D from the corresponding matched 2D bounding boxes that represent the object in 2D. This procedure may be conducted via a number of individual operations. At step 355, the 3D object detection process 294 determines an intersection of a subset of the object cones of each cluster. The subset may be selected to include those object cones that maximize similarity between a projection of the 3D bounding box onto one or more 2D images of the scene and 2D bounding boxes in the one or more 2D images. Then, at step 360, the 3D object detection process 294 generates a 3D shape for each cluster based on the intersection of the subset of object cones. Using a subset in the generating, rather than a simple intersection of all the object cones, may prevent generating a 3D shape that is overly small.

In some instances, multiple 3D shapes may be generated that actually represent the same object (e.g. since the clusters are formed using a "greedy" clustering algorithm). At step 365, the 3D object detection process 294 merges the 3D shape for each cluster with the 3D shape of any other clusters determined to represent the same object. The merging may use a "greedy" clustering algorithm similar to the one that may be used to originally form each cluster. In the merging, the 3D shape of each cluster is refined to be generated from the object boxes of all the clusters merged with it.

At step 370, the 3D object detection process 294 detects any visibility issues caused by a 3D shape occluding the 3D shape of any other clusters that are determined to represent other 3D objects. Until this step, visibility has not been taken into account. A 3D shape from one cluster may hide the 3D shape from another cluster. At step 375, in response to detected visibility issues, the 3D object detection process 294 redistributes object cones from a cluster to one or more other clusters and repeats generating the 3D shape.

Figure 6A:
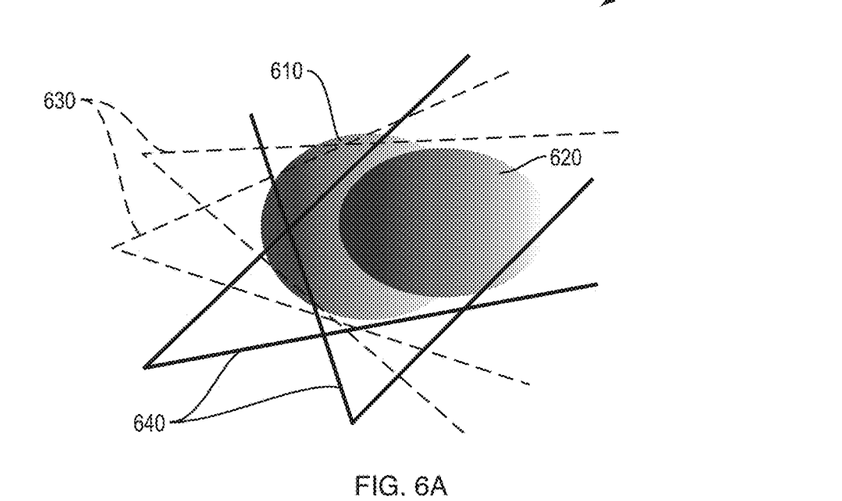
FIGS. 6A and 6B are diagrams depicting examples of redistributing object cones to address visibility issues.
Figure 6B:
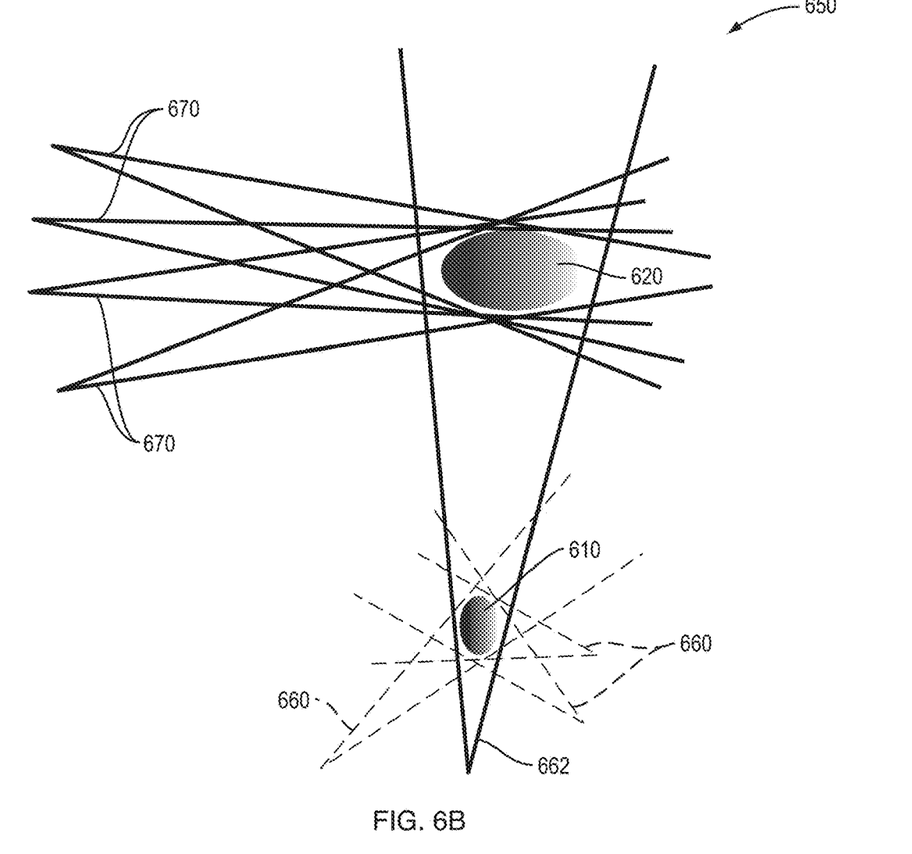

FIGS. 6A and 6B are diagrams 600, 650 depicting examples of redistributing object cones to address visibility issues. In FIG. 6A, object 610 may block object 620 in some 2D images and initially all the object cones may be associated with object 610. As a result of step 375, object cones 630 may stay associated with the 3D shape for object 610, while object cones 640 may be redistributed for use with the 3D shape of object 620. In FIG. 6A, object 610 may block object 620 in some 2D images and initially object cones 660, 662 may be associated with object 610. As a result of step 375, object cones 660 may stay associated with the 3D shape for object 610, while object cone 662 may be redistributed for use with the 3D space of object 620, along with existing object cones 670.

At step 380, the 3D object detection process 294 compares the number of object cones in each cluster to a threshold and removes any cluster that does not include at least a threshold number of object cones. Then, at step 385, if there are any object cones that do not belong to any cluster after step 380, the 3D object detection process 294 loops, and repeats clustering steps for these object cones.

Figure 7:
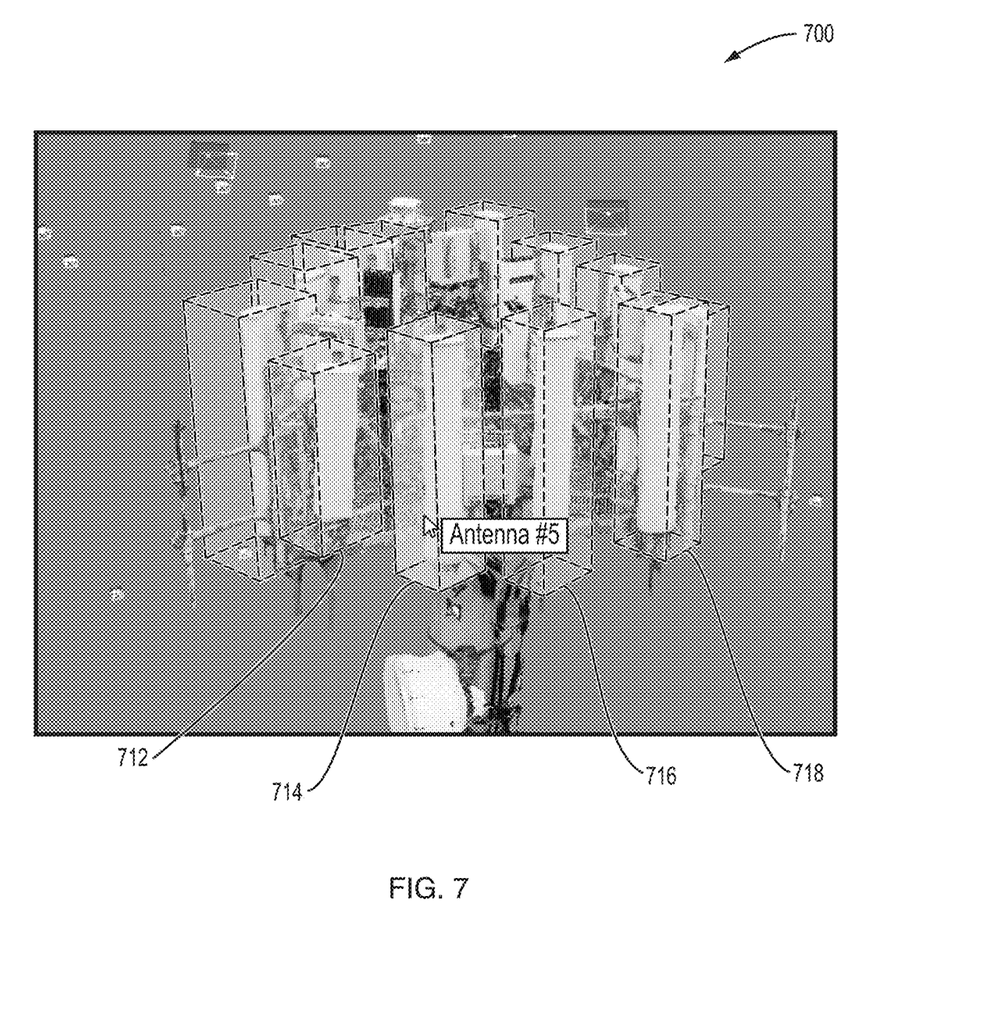
FIG. 7 is an example 2D image of the antenna from FIGS. 4A-4C in which objects have been detected in 3D (as 3D bounding boxes)

The resulting 3D shape for each cluster is used as the 3D bounding box for an object. The 3D bounding box may be assigned the same label as the 2D bounding boxes from which it was derived. FIG. 7 is an example 2D image 700 of the antenna from FIGS. 4A-4C in which objects have been detected in 3D (as 3D bounding boxes) 712, 714, 716, 718. The 3D bounding boxes may be assigned a label (e.g., antenna element).

Figure 8A:
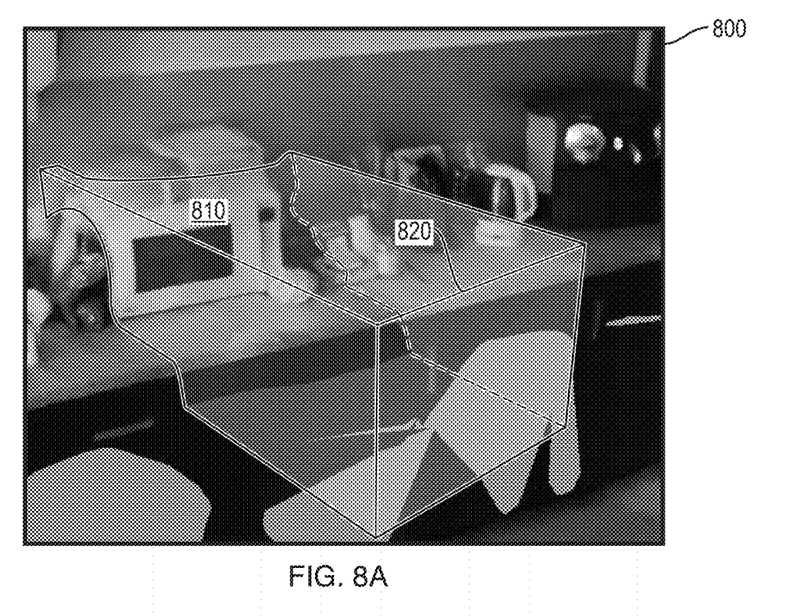
FIG. 8A is an example 2D image including a 3D bounding box for an object (here, a microwave oven) which is overly large.

Sometime a reconstructed 3D bounding box determined in steps 355-385 may be overly large. For example, if the 2D images used are all from substantially the same direction, it may be difficult to evaluate the depth of the object and the 3D bounding box may over extend substantially into the foreground or background. FIG. 8A is an example 2D image 800 including a 3D bounding box 820 for an object (here, a microwave oven) 810 which is overly large. If available, 3D points from SfM photogrammetry (e.g., as a byproduct) may be used to refine the 3D bounding box.

At optional step 390, the SfM photogrammetry process 296 applies SfM photogrammetry to the set of 2D images 298 of the scene and may determine (e.g., as a byproduct) sparse 3D points that represent objects. Such points may be detected by determining 3D points that fall within the intersection of object cones of a cluster for each object. At optional step 395, the 3D object detection process 294 computes a SfM-based 3D bounding box that surrounds the 3D points for each object. Then, at optional step 397, the 3D object detection process 294 refines (e.g., reduces the size) of one or more 3D bounding boxes based on a corresponding SfM-based 3D bounding box. Such reduction may be to the smallest bounding box between the SfM-based 3D bounding box and the original 3D bounding box where a projection of the based 3D bounding box onto each 2D image is "close" (i.e. within a deviation threshold) of the 2D bounding box for the object.

Figure 8B:
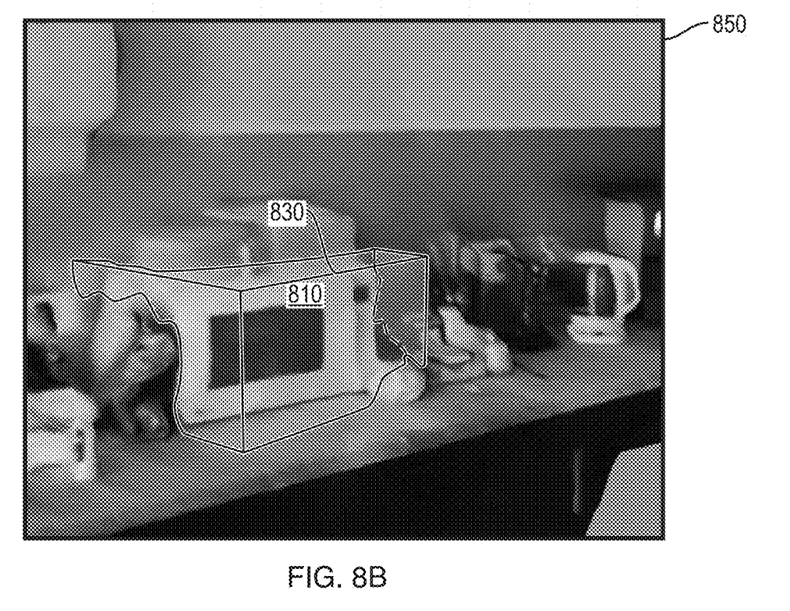
FIG. 8B is an example 2D image including a reduced 3D bounding box for the object from FIG. 8A based on 3D points from SfM photogrammetry.

FIG. 8B is an example 2D image 850 including a reduced 3D bounding box 830 for the object (here, a microwave oven) 810 from FIG. 8A based on 3D points from SfM photogrammetry. As can be seen, the 3D bounding box 830 better conforms to the actual size of the object.

Finally, at step 399 each determined 3D bounding box is returned, to be displayed on the display screen 260 by the UI process 290, stored to a storage device 275, or otherwise utilized It should be understood that various adaptations and modifications may be readily made to what is described above, to suit various implementations and environments. While it is discussed above that many aspects of the techniques may be implemented by specific software processes (e.g., of an application stored in a non-transitory electronic device readable medium for execution on one or more processors) or on specific hardware devices, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for detecting three-dimensional (3D) objects in a scene, comprising:
    accessing a set of two-dimensional (2D) images of a scene captured by one or more cameras;
    detecting, by a 2D object detection process executing on one or more computing devices, an object in the set of 2D images as 2D bounding boxes;
    matching, by a 3D object detection process executing on the one or more computing devices, ones of the 2D bounding boxes that correspond to the object by determining an object cone for each of the 2D bounding boxes and building a cluster of object cones based at least in part on a score determined from a number of other object cones that contain a common center point;
    selecting at least a subset of the object cones of the cluster;
    reconstructing, by the 3D object detection process, a 3D bounding box that represents the object from an intersection of at least the subset of object cones of the cluster; and
    displaying, on a display screen or storing to a storage device, the 3D bounding box.

2. The method of claim 1, wherein the common center point is a center point for a triplet of intersecting object cones, and the building the cluster comprises:
    selecting the triplet of intersecting object cones;
    determining the center point for the triplet;
    determining one or more other object cones that contain the center point; and
    adding the one or more other object cones to the triplet to produce the cluster.

3. The method of claim 2, wherein the score is a score for the triplet and building the cluster comprises:
    determining the score for the triplet based on the number of other object cones that contain the center point for the triplet; and
    retaining the triplet based on the score for the triplet.

4. The method of claim 1, wherein the reconstructing the 3D bounding box comprises:
    generating a 3D shape for the cluster based on the intersection of the subset of object cones; and
    providing the 3D shape for the cluster as the 3D bounding box.

5. The method of claim 4, wherein the subset of object cones are selected as object cones that maximize similarity between a projection of the 3D bounding box onto one or more 2D images of the scene and 2D bounding boxes in the one or more 2D images.

6. The method of claim 4, wherein the reconstructing the 3D bounding box further comprises:
    merging the 3D shape for the cluster with a 3D shape of one or more other clusters determined to represent the object.

7. The method of claim 4, wherein reconstructing the 3D bounding box further comprises:
    detecting visibility issues caused by the 3D shape for the cluster occluding a 3D shape of one or more other clusters determined to represent other objects; and
    in response to the visibility issues, redistributing object cones from the cluster to the one or more other clusters and repeating generating the 3D shape.

8. The method of claim 4, wherein reconstructing the 3D bounding box further comprises:
    removing one or more other clusters that do not include at least a threshold number of object cones and repeating generating the 3D shape.

9. The method of claim 1, further comprising:
    refining the 3D bounding box based on structure-from-motion (SfM) photogrammetry performed using the 2D images of the scene.

10. The method of claim 9, wherein the refining further comprises:
    applying SfM photogrammetry to the 2D images of the scene to determine sparse 3D points that represent the object;
    determining a SfM-based 3D bounding box that surrounds the 3D points; and
    reducing a size of the 3D bounding box based on the SfM-based 3D bounding box.

11. The method of claim 1, further comprising:
    assigning each of the 2D bounding boxes a label,
    wherein the matching matches 2D bounding boxes having a same label.

12. The method of claim 11, further comprising:
    assigning the 3D bounding box the label of the matched 2D bounding boxes.

13. A computing device comprising:
    a processor; and
    a memory coupled to the processor and configured to store a set of two-dimensional (2D) images of a scene and code executable on the processor for a plurality of software processes, the plurality of software processes including:
        a 2D object detection process configured to detect an object in the set of 2D images as 2D bounding boxes, and
        a three-dimensional (3D) object detection process configured to
            match ones of the 2D bounding boxes that correspond to the object by determining an object cone for each of the 2D bounding boxes and building a cluster of object cones based at least in part on a score determined from a number of other object cones that contain a common center point,
            select at least a subset of the object cones of the cluster,
            reconstruct a 3D bounding box that represents the object from an intersection of at least the subset of object cones of the cluster, and output the 3D bounding box.

14. A non-transitory electronic-device readable medium having instructions stored thereon, the instructions when executed by one or more processors of one or more electronic devices operable to:
    access a set of two-dimensional (2D) images of a scene;
    detect an object in 2D in the set of 2D images;
    determine an object cone for each 2D image of the 2D images;
    build a cluster of object cones for the object by selecting a subset of intersecting object cones, determining a common center point of the subset, determining a score based on whether one or more other object cones contain the common center point, and retaining the cluster based on the score;

select at least a subset of the object cones of the cluster;

generate a three-dimensional (3D) shape for the cluster based on an intersection of at least the subset of object cones; and output the 3D shape as the object in 3D.

15. The non-transitory electronic-device readable medium of claim 14, wherein the subset is a triplet of intersecting object cones, the common center point is a center point for the triplet of intersecting object cones, the score is a score for the triple, and the instructions when executed are further operable to:

select the triplet of intersecting object cones;

determine the center point for the triplet;

determine the score for the triplet based on whether one or more other object cones contain the center point;

retain the triplet based on the score for the triple; and add the one or more other object cones to the triplet to produce the cluster.

16. The non-transitory electronic-device readable medium of claim 14, wherein the instructions when executed are further operable to:

merge the 3D shape for the cluster with a 3D shape of one or more other clusters determined to represent the object;

detect visibility issues caused by the 3D shape for the cluster occluding a 3D shape of one or more other clusters determined to represent the other objects; and in response to the visibility issues, redistribute object cones from the cluster to the one or more other clusters.

17. The non-transitory electronic-device readable medium of claim 14, wherein the instructions when executed are further operable to:

refine the 3D bounding box based on a structure-from-motion (SfM) photogrammetry performed using the 2D images of the scene.

18. A method for detecting three-dimensional (3D) objects in a scene, comprising:

accessing a set of two-dimensional (2D) images of the scene;

detecting, by a 2D object detection process executing on one or more computing devices, an object in 2D in the set of 2D images;

determining an object cone for each 2D image of the 2D images;

building a cluster of object cones for the object by selecting a subset of intersecting object cones, determining a common center point of the subset, determining a score based on whether one or more other object cones contain the common center point, and retaining the cluster based on the score;

selecting at least a subset of the object cones of the cluster;

generating a 3D shape for the cluster based on an intersection of at least the subset of object cones; and outputting the 3D shape as the object in 3D.

19. The method of claim 18, wherein the subset is a triplet of intersecting object cones, the common center point is a center point for the triplet of intersecting object cones, the score is a score for the triple, and the building the cluster further comprises:

selecting the triplet of intersecting object cones;

determining the center point for the triplet;

determining the score for the triplet based on whether one or more other object cones contain the center point;

retaining the triplet based on the score for the triple, and adding the one or more other object cones to the triplet to produce the cluster.

20. The method of claim 18, further comprising:

merging the 3D shape for the cluster with a 3D shape of one or more other clusters determined to represent the object;

detecting visibility issues caused by the 3D shape for the cluster occluding a 3D shape of one or more other clusters determined to represent the other objects; and in response to the visibility issues, redistributing object cones from the cluster to the one or more other clusters.

21. The method of claim 18, further comprising:

refining the 3D bounding box based on a structure-from-motion (SfM) photogrammetry performed using the 2D images of the scene.

* * * * *

UNITED STATES PATENT AND TRADEMARK OFFICE
CERTIFICATE OF CORRECTION

PATENT NO. : 11,281,935 B2
APPLICATION NO. : 16/726412
DATED : March 22, 2022
INVENTOR(S) : Hoang Hiep Vu et al.

It is certified that error appears in the above-identified patent and that said Letters Patent is hereby corrected as shown below:

In the Specification

Column 4, Line 2 reads:
"bounding boxes. The software processes may 291-296 may"
Should read:
--bounding boxes. The software processes 291-296 may--

Column 4, Line 4 reads:
"and/or on a storage devices 275. This data may include the"
Should read:
--and/or on storage devices 275. This data may include the--

In the Claims

Claim 15:

Column 9, Line 13 reads:
"the triple, and the instructions when executed are further"
Should read:
--the triplet, and the instructions when executed are further--

Column 9, Line 19 reads:
"retain the triplet based on the score for the triple; and"
Should read:
--retain the triplet based on the score for the triplet; and--

Signed and Sealed this
Twenty-third Day of July, 2024

Katherine Kelly Vidal
*Director of the United States Patent and Trademark Office*

Claim 19:

Column 10, Line 20 reads:
"score is a score for the triple, and the building the cluster"
Should read:
--score is a score for the triplet, and the building the cluster--

Column 10, Line 26 reads:
"retaining the triplet based on the score for the triple, and"
Should read:
--retaining the triplet based on the score for the triplet, and--